(12) United States Patent
Lee et al.

(10) Patent No.: US 9,308,677 B2
(45) Date of Patent: *Apr. 12, 2016

(54) DOOR OF REFRIGERATOR AND METHOD FOR MANUFACTURING THE SAME

(71) Applicant: Samsung Electronics Co., Ltd., Suwon-si (KR)

(72) Inventors: Jeong Wook Lee, Gwangju (KR); Sang Chul Ryu, Gwangju (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 419 days.

This patent is subject to a terminal disclaimer.

(21) Appl. No.: 13/690,430

(22) Filed: Nov. 30, 2012

(65) Prior Publication Data

US 2013/0086846 A1    Apr. 11, 2013

Related U.S. Application Data

(63) Continuation of application No. 12/385,262, filed on Apr. 2, 2009, now Pat. No. 8,336,974.

(30) Foreign Application Priority Data

Aug. 5, 2008  (KR) .................. 10-2008-0076241

(51) Int. Cl.
*B29C 44/12* (2006.01)
*F25D 23/02* (2006.01)
*B29C 65/78* (2006.01)

(52) U.S. Cl.
CPC ......... *B29C 44/1233* (2013.01); *B29C 44/1238* (2013.01); *B29C 44/1257* (2013.01); *B29C 65/7811* (2013.01); *B29C 65/7817* (2013.01); *F25D 23/028* (2013.01); *F25D 2400/18* (2013.01); *Y10T 29/49629* (2015.01)

(58) Field of Classification Search
USPC .............. 264/46.4, 46.5, 46.6, 261, 263, 267, 264/273
See application file for complete search history.

(56) References Cited

U.S. PATENT DOCUMENTS

| | | | |
|---|---|---|---|
| 2,708,294 A | | 5/1955 | Saunders |
| 4,053,972 A | * | 10/1977 | Kordes ........................... 29/423 |
| 4,496,201 A | | 1/1985 | Allgeyer |
| 4,583,796 A | | 4/1986 | Nakajima et al. |

(Continued)

FOREIGN PATENT DOCUMENTS

| | | |
|---|---|---|
| CN | 1080046 | 12/1993 |
| JP | 62-100481 | 6/1987 |

(Continued)

OTHER PUBLICATIONS

Korean Office Action dated Nov. 21, 2011 in corresponding Korean Application No. 10-2008-0076241.

(Continued)

*Primary Examiner* — Atul P. Khare
(74) *Attorney, Agent, or Firm* — Staas & Halsey LLP

(57) ABSTRACT

In a refrigerator door in which a decoration member is mounted to a door frame using a foam material, the foam material fills a space formed between the decoration member mounted to a front side of the door frame and a rear panel mounted to a rear side of the door frame. Accordingly, the decoration member can be fixed to the door frame through direct contact with the foam material.

13 Claims, 10 Drawing Sheets

(56) References Cited

U.S. PATENT DOCUMENTS

| | | | |
|---|---|---|---|
| 4,821,399 A * | 4/1989 | Markley et al. | 29/458 |
| 5,048,233 A | 9/1991 | Gidseg et al. | |
| 5,197,790 A | 3/1993 | Katz | |
| 5,533,311 A | 7/1996 | Tirrell et al. | |
| 5,544,454 A | 8/1996 | Richardson et al. | |
| 5,568,712 A | 10/1996 | Jenkins et al. | |
| 5,588,731 A * | 12/1996 | Schmidt et al. | 312/405 |
| 5,704,107 A * | 1/1998 | Schmidt et al. | 29/460 |
| 5,910,083 A * | 6/1999 | Richardson et al. | 52/171.1 |
| 6,059,420 A | 5/2000 | Rogers | |
| 8,028,394 B2 * | 10/2011 | Takaoka | 29/527.1 |
| 8,336,974 B2 * | 12/2012 | Lee et al. | 312/405 |
| 2004/0177591 A1 | 9/2004 | Avendano et al. | |
| 2004/0183413 A1 | 9/2004 | Koo | |
| 2004/0183414 A1 | 9/2004 | Kwon | |
| 2006/0265960 A1 | 11/2006 | Leimkuehler et al. | |
| 2008/0042537 A1 | 2/2008 | Kim et al. | |
| 2008/0143227 A1 | 6/2008 | Kim et al. | |

FOREIGN PATENT DOCUMENTS

| | | |
|---|---|---|
| JP | 1-136888 | 9/1989 |
| JP | 01-314884 | 12/1989 |
| JP | 05-126461 | 5/1993 |
| JP | 5-126461 | 5/1993 |
| JP | 5-322436 | 12/1993 |
| JP | 7-270047 | 10/1995 |
| KR | 10-2001-0055128 | 7/2001 |
| KR | 10-2006-0012802 | 2/2006 |

OTHER PUBLICATIONS

Chinese Office Action for related Chinese Patent Application No. 200910140582.2, mailed on Jul. 18, 2012.

Office Action mailed Aug. 22, 2011 in U.S. Appl. No. 12/385,262.

Office Action mailed Apr. 12, 2012 in U.S. Appl. No. 12/385,262.

Notice of Allowance mailed Aug. 22, 2012 in U.S. Appl. No. 12/385,262.

U.S. Appl. No. 12/385,262, filed Apr. 2, 2009, Jeong Wook Lee et al., Samsung Electronics Co., Ltd.

Korean Office Action for related Korean Patent Application No. 10-2008-0076241, mailed on Nov. 21, 2011.

* cited by examiner

DOOR OF REFRIGERATOR AND METHOD FOR MANUFACTURING THE SAME

CROSS-REFERENCE TO RELATED APPLICATIONS

This application is a continuation application of U.S. patent application Ser. No. 12/385,262 filed on Apr. 2, 2009 in the U.S. Patent and Trademark Office. This application claims the priority benefit of U.S. patent application Ser. No. 12/385,262, the disclosure of which is incorporated herein by reference. This application claims the priority benefit of Korean Patent Application No. 10-2008-0076241, filed on Aug. 5, 2008, in the Korean Intellectual Property Office, the disclosure of which is incorporated herein by reference.

BACKGROUND

1. Field

The present invention relates to a door of a refrigerator and a manufacturing method for the same, and more particularly to a refrigerator door attached with a decoration member on a front side thereof and a manufacturing method for the same.

2. Description of the Related Art

A refrigerator is an apparatus that supplies cold air generated by a refrigeration cycle into storage compartments to thereby enable longtime preservation of food in a fresh state. The refrigerator generally includes a main body constituting the storage compartment storing food therein, and a door pivotably mounted to the main body to open and close the storage compartment.

Nowadays, the refrigerator does not merely occupy an interior space to store food but also functions as an interior design like a piece of furniture. Especially, the door of the refrigerator, which is always exposed to users, is attached with a dedicated decoration member.

The door includes a door frame constituting a framework thereof, a front panel connected to a front side of the door frame to prevent a foam material from leaking through the front side, a rear panel connected to a rear side of the door frame to form a foaming space together with the front panel, a chassis fixing a decoration member by connection with the door frame, and the decoration member fixed to the chassis to improve the front look of the refrigerator.

The door frame is constructed by pluralities of vertical frames and horizontal frames. The chassis is constructed by an upper chassis connected to an upper part of the door frame, a lower chassis connected to a lower part of the door frame, a left chassis connected to the left of the door frame, and a right chassis connected to the right of the door frame. After assembling those plural parts, the decoration member is fixed to the chassis, thereby completing construction of the refrigerator door.

SUMMARY

According to an aspect of an embodiment of the present invention, there is provided a door of a refrigerator including a door frame opened frontward and rearward; a decoration member mounted to a front side of the door frame; a rear panel mounted to a rear side of the door frame; and a foam material filling a space between the decoration member and the rear panel, wherein the decoration member is fixed to the door frame by adhesion of the foam material.

The front side of the door frame may include a decoration member mounting part to support the decoration member.

The decoration member mounting part may include at least one opening to enable contact between the foam material and the decoration member.

The front side of the door frame may include a position fixing elastic projection formed along an outer periphery of the decoration member mounting part.

The decoration member mounting part may include an elastic groove formed along a lower periphery of the position fixing elastic projection.

The position fixing elastic projection may include gaps formed at predetermined intervals.

The front side of the door frame may include a display mounting part having a smaller height than the decoration member mounting part.

The decoration member mounting part may include a handle part formed at a stepped part with respect to the display mounting part.

The door frame may include a rear panel mounting assembly that supports the rear panel from the rear side.

The rear panel mounting assembly may comprise a supporting member that supports the rear panel, and a fastening member that fixes the supporting member to the door frame.

The supporting member and the fastening member are connected with each other by force fit.

The supporting member may include a lower fixing platform whereas the fastening member includes an upper fixing platform.

The refrigerator door may further include a plurality of fastening members to fix the supporting member to the door frame, each fastening member may be formed as an integrated body with the door frame and arranged at predetermined intervals.

The refrigerator door may further comprise a holding member to prevent the foam material from expanding into spaces among the plurality of fastening members.

According to another aspect of an embodiment of the present invention, there is provided a refrigerator door which may include a door frame; a decoration member mounted to a front side of the door frame; a rear panel mounted to a rear side of the door frame; and a foam material filling an inner space of the door frame, wherein the door frame includes both lateral sides, a top side and a bottom side all formed as an integrated body so that the foam material can expand to the front side to contact the decoration member, and so that the decoration member is fixed to the door frame by adhesion of the foam material.

The door frame may include a decoration member mounting part in which the decoration member is mounted, including at least one opening to enable contact between the foam material and the decoration member.

According to another aspect of an embodiment of the present invention, there is provided a method for manufacturing a refrigerator door, including forming a door frame as an integrated body by injection molding; mounting a decoration member to a front side of the door frame; injecting a foam material into contact with the decoration member, wherein the decoration member is fixed to the door frame by adhesion of the foam material.

The manufacturing method may further include mounting a rear panel to a rear side of the door frame.

The door frame may include a decoration member mounting part including an opening that passes the foam material therethrough.

BRIEF DESCRIPTION OF THE DRAWINGS

These and/or other aspects, features, and advantages of exemplary embodiments of the invention will become apparent and more readily appreciated from the following description of exemplary embodiments, taken in conjunction with the accompanying drawings, of which.

DETAILED DESCRIPTION OF EMBODIMENTS

Figure 1:
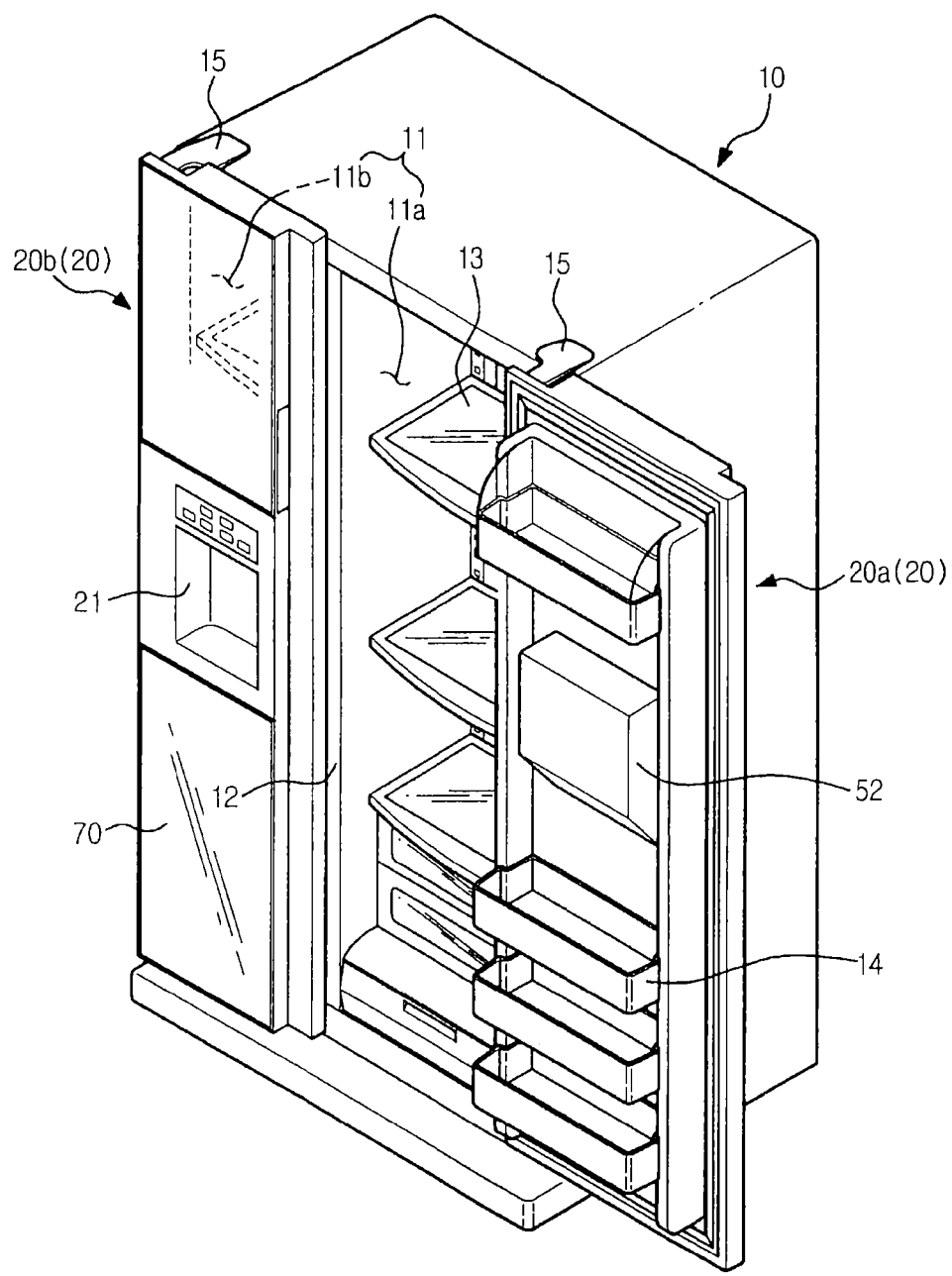
FIG. 1 shows the whole structure of a refrigerator according to an exemplary embodiment of the present invention.

Reference will now be made in detail to exemplary embodiments of the present invention, examples of which are illustrated in the accompanying drawings, wherein like reference numerals refer to like elements throughout. Exemplary embodiments are described below to explain the present invention by referring to the figures.

FIG. 1 shows the overall structure of a refrigerator according to an exemplary embodiment of the present invention.

As shown in FIG. 1, the refrigerator includes a main body 10 including a storage compartment 11 storing food therein, and a door 20 pivotably mounted to the main body 10 to open and close the storage compartment 11. The storage compartment 11 is divided by a middle partition 12 into a refrigerating compartment 11a for refrigerated preservation of food and a freezing compartment 11b for freezing preservation of food. Opening and closing of the refrigerating compartment 11a and the freezing compartment 11b is achieved by a refrigerating compartment door 20a and a freezing compartment door 20b, respectively. To this end, a hinge device 15 is mounted to an upper end and a lower end of the main body 10 so that the door 20 can open and close the storage compartment 11 in a pivoting manner.

The storage compartment 11 includes a plurality of shelves 13 to receive food or food containers. The refrigerating compartment door 20a is mounted with a rack 14 to hold containers such as beverage bottles. Especially, the refrigerating compartment door 20a is provided with a home bar 52 such that a user can take out the beverage bottles without having to open the refrigerating compartment door 20a. Also, the freezing compartment 20b is provided with a dispenser 21 for the user to withdraw water or ice without having to open the freezing compartment door 20b. Additionally, a decoration member 70 is mounted to front sides of the respective doors 20a and 20b in order to improve the front look of the refrigerator. For example, wood, tempered glass, acryl, aluminum and a colored steel plate can be used for the decoration member 70.

In an exemplary embodiment of the present invention, since the refrigerating compartment door 20a and the freezing compartment door 20b are structured and manufactured in the same manner, they will be explained collectively as the door 20 hereinafter.

Figure 2:
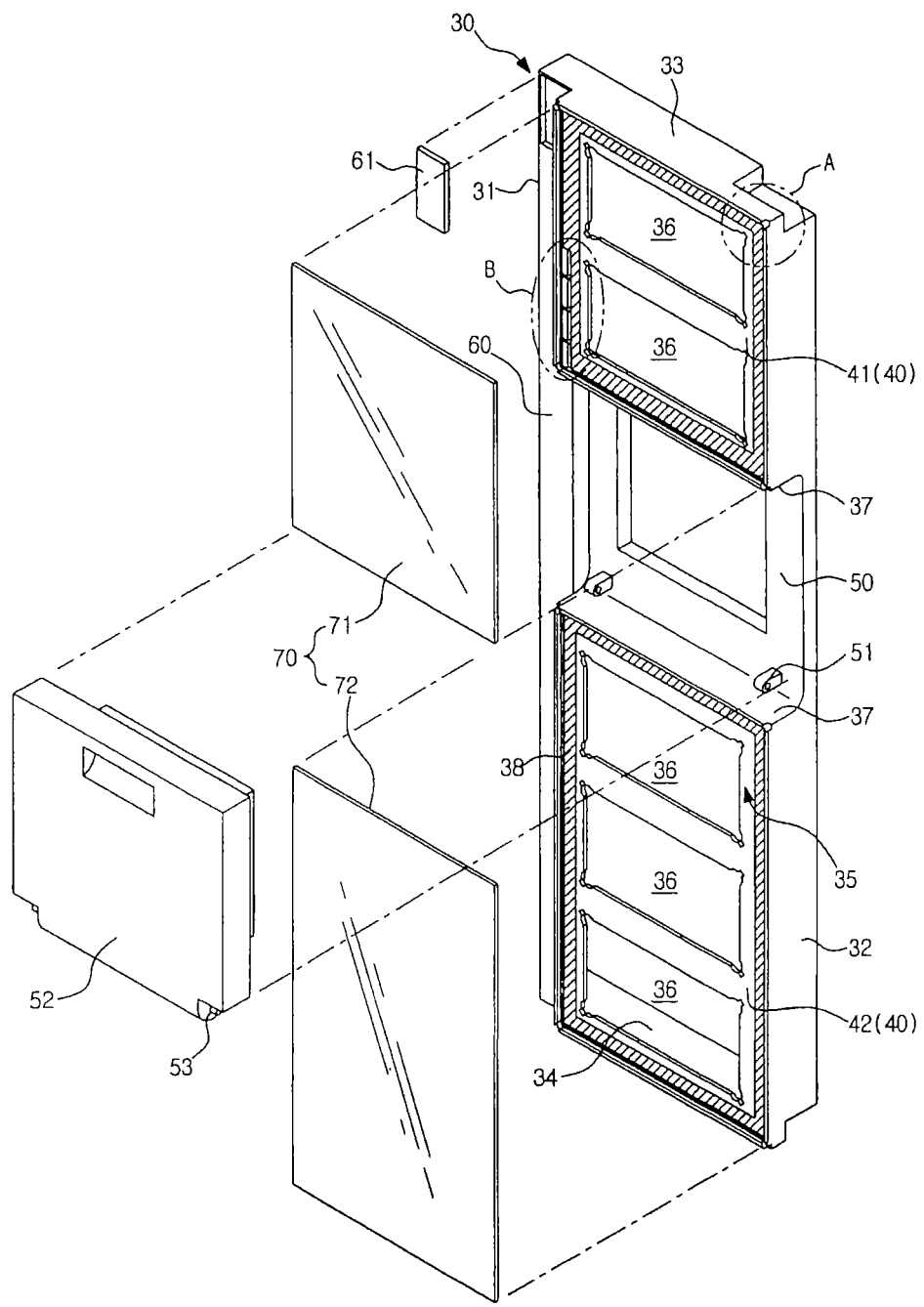
FIG. 2 shows a front connection state of a door of the refrigerator according to an exemplary embodiment of the present invention.

FIG. 2 shows a connection state at the front of the door of the refrigerator according to an exemplary embodiment of the present invention.

As shown in FIG. 2, the door 20 of the refrigerator includes a door frame 30 formed as an integrated body. Here, the door frame 30 is made of resin by one-time injection molding. Since the door frame 30 has such a great size, distortion or contraction may be generated during the injection molding. Therefore, gas injection molding, which is capable of compensating for the defects, is applied to manufacture the door frame 30 as an integrated body at once.

More specifically, the door frame 30 has a hexahedral form, that is, comprising both lateral sides 31 and 32 formed on the left and the right, and a top side 33 and a bottom side 34 respectively formed at a top and a bottom. In addition, the door frame 30 includes a front side 35 connected to the both lateral sides 31 and 32, and the top and the bottom sides 33 and 34. The front side 35, the lateral sides 31 and 32, and the top and the bottom sides 33 and 34 are all connected with one another and formed as an integrated body. Since there are no gaps generated at connection parts among the front side 35, the lateral sides 31 and 32, the top side 33 and the bottom side 34, which are all integrally formed, leakage of a foam material is not caused.

However, since a plurality of openings 36 are formed on the front side 35 of the door frame 30, the foam material would expand through the openings 36 toward the front of the door frame 30. The decoration member 70 is fixed to the door frame 30 using adhesion of the foam material. This will be explained in greater detail hereinafter. Here, the foam material refers to a non-thermally conductive material for heat insulation, such as asbestos, glass fiber, cork, foamed plastic and so on. Urethane, especially, used for the foam material expands through a chemical reaction in a liquid state and cures in a predetermined time, thereby possessing adhesion.

The front side 35 of the door frame 30 is divided largely into four parts, that is, a first decoration member mounting part 41 disposed at an uppermost part to receive a first decoration member 71, a second decoration member mounting part 42 disposed at a lowermost part to receive a second decoration member 72, a home bar mounting part 50 disposed in the middle to mount the home bar 52, and a display mounting part 60 vertically disposed along the left side of a decoration member mounting part 40 and the home bar mounting part 50, the decoration member mounting part 40 comprising the first decoration member mounting part 41 and the second decoration member mounting part 42.

Since the home bar 52 has a great thickness in comparison with the decoration member 70, the home bar mounting part 50 is formed to be depressed rearward more than the decoration member mounting part 40. Here, by the depression of the home bar mounting part 50 with respect to the decoration member mounting part 40, a stepped part 37 is formed along an outer periphery of the home bar mounting part 50. The stepped part 37 prevents entry of the foam material to the home bar mounting part 50 from the decoration member mounting part 40.

Shaft connection parts 51 are formed at a lower part of the home bar mounting part 50. Shafts 53 each formed at both lower ends of the home bar 52 are engaged with the shaft connection parts 51 so that the home bar 52 can be opened and closed by pivoting. Although not shown, a reinforcing member can be mounted to a rear side of the shaft connection parts 51. The shaft connection parts 51 have low strength since being formed by injection molding of resin. Therefore, the reinforcing member containing steel or aluminum may be added to improve the strength.

In addition, a display 61 is mounted to an uppermost end of the display mounting part 60 to supply the user with information by displaying operational states of the refrigerator, including the temperature of the storage compartment.

Figure 3:
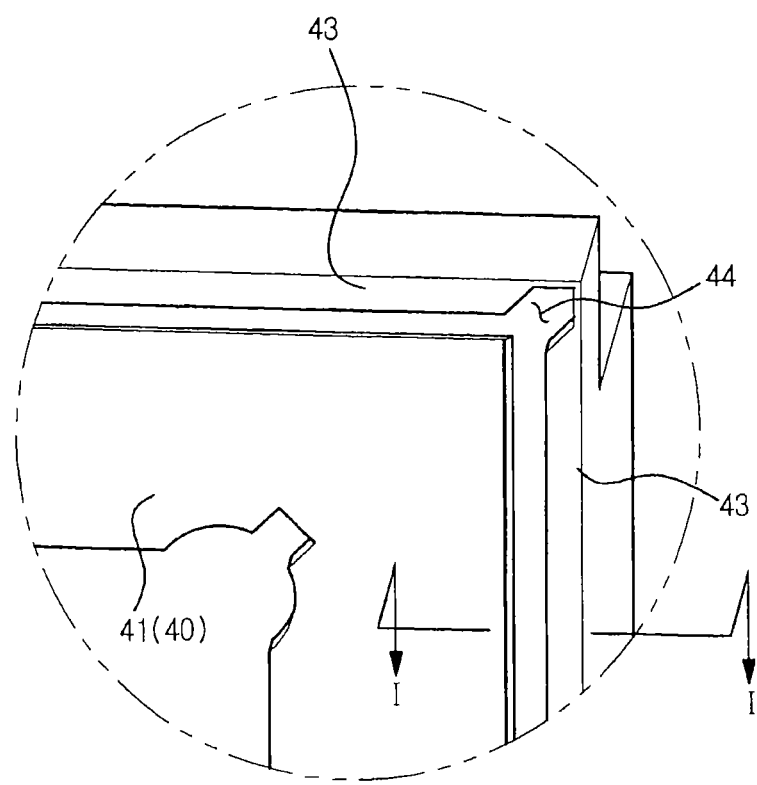
FIG. 3 is an enlarged view of a section A of FIG. 2.
Figure 4:
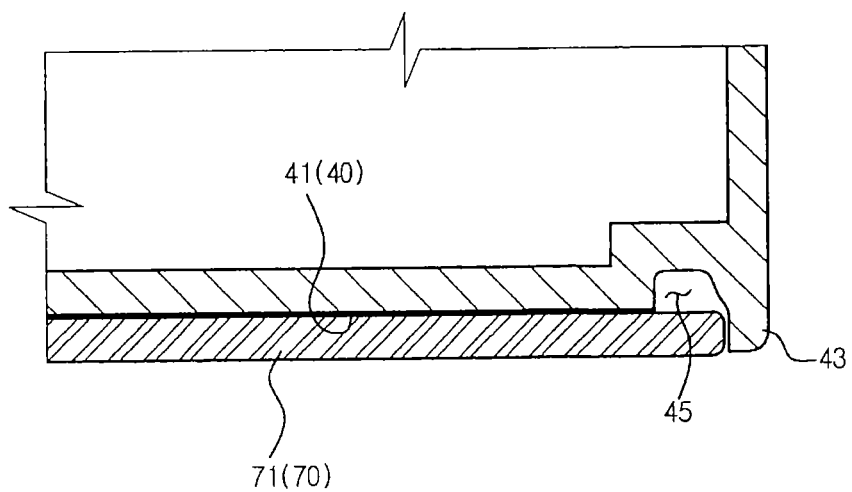
FIG. 4 is a sectional view cut along a line I-I of FIG. 3.

FIG. 3 is an enlarged view of a section A of FIG. 2, and FIG. 4 is a sectional view of FIG. 3 taken along a line I-I.

As shown in FIGS. 2 and 3, a position fixing elastic projection 43 is formed at the front side 35 of the door frame 30 along an outer periphery of the first decoration member mounting part 41. Also made by injection molding of resin, the position fixing elastic projection 43 contracts and expands according to variation of the temperature. Therefore, in order to prevent thermal deformation of the position fixing elastic projection 43, gaps 44 are formed on the position fixing elastic projection 43 at predetermined intervals. The section A of FIG. 2 shows one of corners of the position fixing elastic projection 43 and FIG. 3 enlargingly shows the section A. Referring to FIGS. 2 and 3, the position fixing elastic projection 43 has the gap 44 at every corner. The gap 44 serves as a spare space allowing for contraction and expansion of the position fixing elastic projection 43, thereby preventing breakage and deformation of the position fixing elastic projection 43 under temperature variation. Here, the gaps 44 may be disposed at positions of the position fixing elastic projection 43 other than the corners. Also, various shapes and sizes of the gaps 44 are allowable other than as shown in FIG. 3.

As shown in FIG. 2 and FIG. 4, the first decoration member mounting part 41 includes an elastic groove 45 depressed by a predetermined depth along an inner periphery of the position fixing elastic projection 43. In FIG. 4, the first decoration member 71 is in contact with the position fixing elastic projection 43, as received in the first decoration member mounting part 41. As aforementioned, as the position fixing elastic projection 43 contracts or expands according to the temperature, the first decoration member 71 may be pressed by the position fixing elastic projection 43. In this case, the position fixing elastic projection 43 being made of resin may be damaged since the decoration member 70 is made of tempered glass or wood. In this regard, the elastic groove 45 is formed at the first decoration member mounting part 41 along the inner periphery of the position fixing elastic projection 43 so as to increase elasticity of the position fixing elastic projection 43. Since the elastic groove 45 has an effect of lengthening the position fixing elastic projection 43, elasticity of the position fixing elastic projection 43 is accordingly increased as much as the increased length. As a result, although the position fixing elastic projection 43 presses the first decoration member mounting part 71 by contracting and expanding, possibility of damage thereof is greatly reduced, thereby improving reliability of the product.

Referring to FIG. 2, in addition, the position fixing elastic projection 43 is formed at the second decoration member mounting part 42 as well. In the same manner as explained above with FIG. 2 to FIG. 4, the position fixing elastic projection 43 includes the gaps 44 while the second decoration member mounting part 42 includes the elastic groove 45.

The decoration member mounting part 40 further includes a plurality of openings 36. Referring to FIG. 2, the first decoration member mounting part 41 includes two openings 36 whereas the second decoration member mounting part 42 includes three openings 36. That is, a plurality of openings 36 can be provided depending on the surface area of each of the decoration member mounting part 40. At least one opening 36 needs to be formed at each decoration member mounting part 40 so that the foam material can fix the decoration member 70 by passing through the opening 36.

Figure 5:
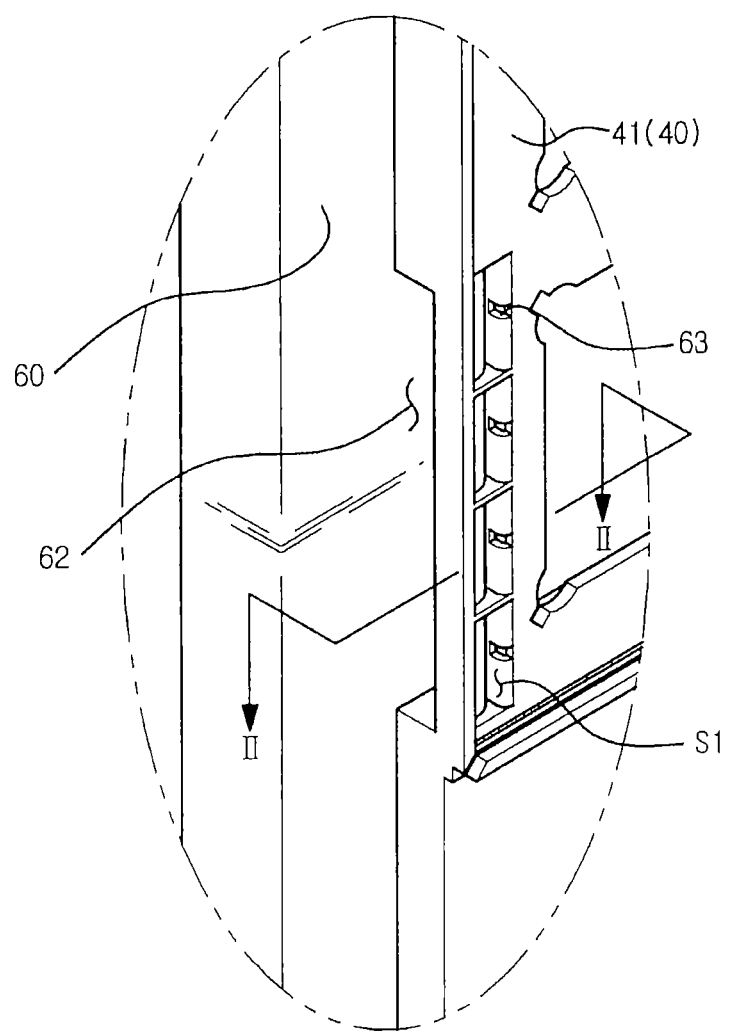
FIG. 5 is an enlarged view of a section B of FIG. 2.
Figure 6:
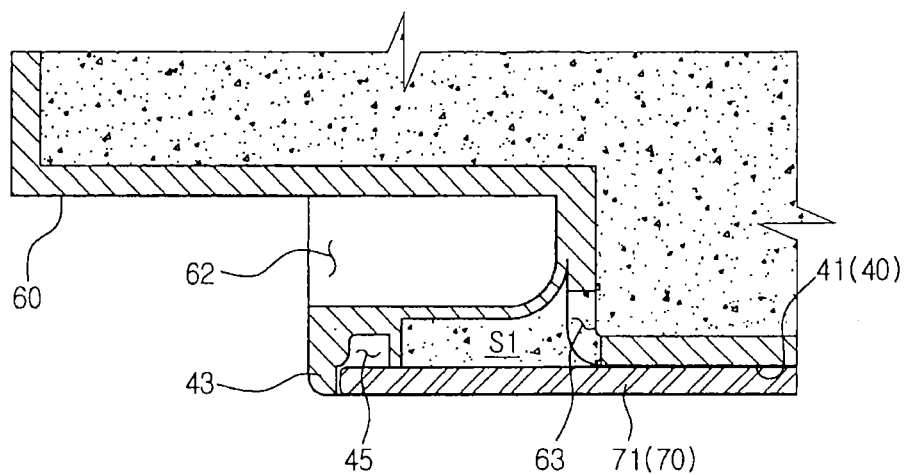
FIG. 6 is a sectional view cut along a line II-II of FIG. 5.

FIG. 5 enlargingly shows a section B of FIG. 2. FIG. 6 is a sectional view cut along a line II-II of FIG. 5.

As shown in FIG. 2, FIG. 5 and FIG. 6, a handle part 62 is formed at the front side 35 of the door frame 30 to enable the user to open and close the door 20. The decoration member mounting part 40 has a greater height than the display mounting part 60. Referring to FIGS. 5 and 6, therefore, the handle part 62 is formed where the height difference between the first decoration member mounting part 41 and the display mounting part 60 is generated so that the user can open and close the door 20 by inserting his or her hand. Since the handle part 62 has a depression form having a vacant inner space, the part of the first decoration member mounting part 41 corresponding to the handle part 62 becomes relatively thinner, thereby being deteriorated in strength. To this end, a foam penetration hole 63 is formed at the section B of the decoration member mounting part 40 so that the foam material, which comes to possess predetermined strength as curing, fills a first space S1 formed at an outer surface of the handle part 62, and thereby reinforces the strength of the decoration member mounting part 40.

Additionally, referring to FIG. 2, an adhesive member 38 is formed between the decoration member 70 and the decoration member mounting part 40. In FIG. 2, a double side tape is attached to the decoration member mounting part 40 as an example of the adhesive member 38. The adhesive member 38 temporarily fixes the decoration member 70 to the decoration member mounting part 40 for accurate positioning of the decoration member 70 with respect to the decoration member mounting part 40. Afterward, the decoration member 70 is fixed to the decoration member mounting part 40 by adhesion of the foam material. Therefore, the adhesive member 38 is dispensable in this exemplary embodiment since the decoration member 70 can be fixed to the decoration member mounting part 40 by the foam without dedicatedly requiring the adhesive member 38.

Figure 7:
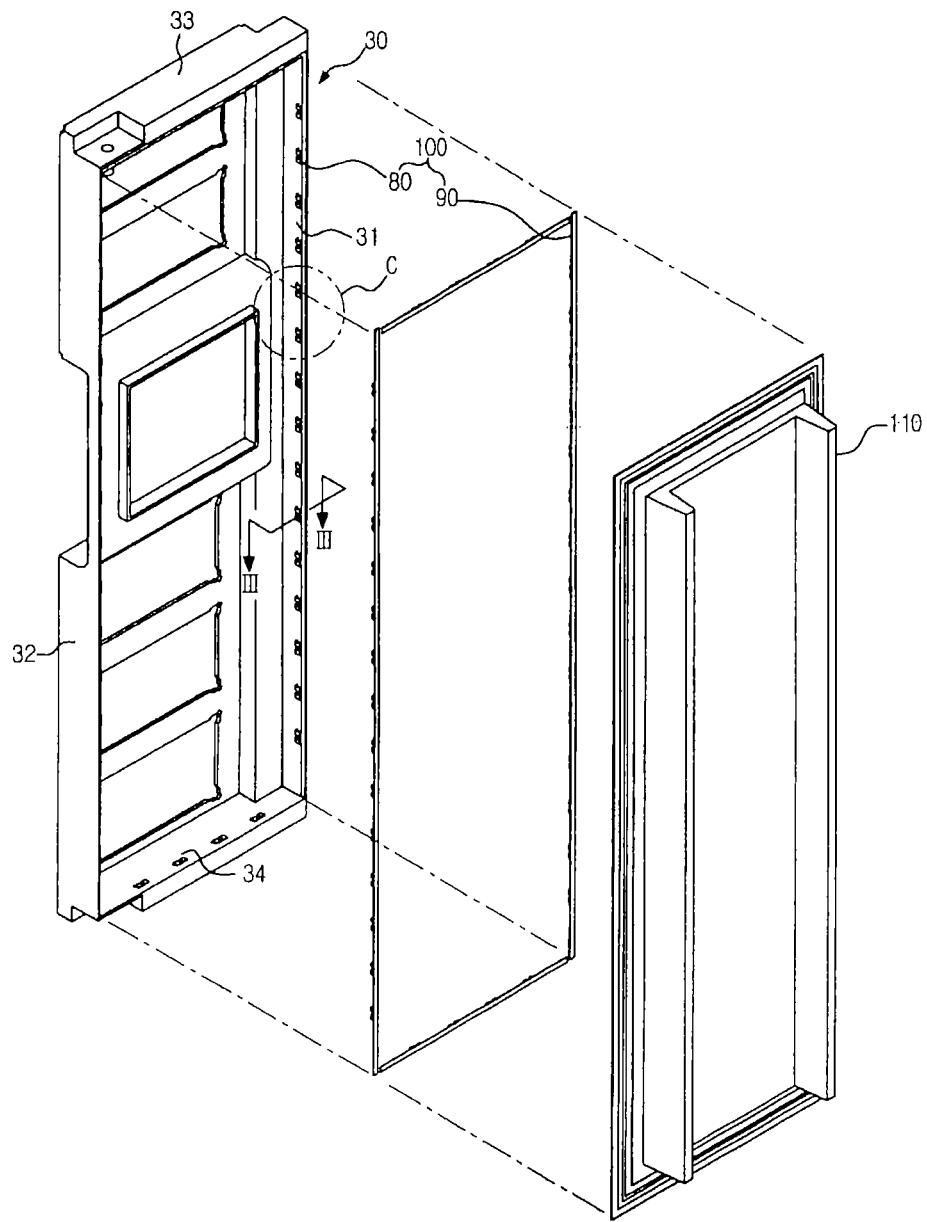
FIG. 7 shows a rear connection state of the door of the refrigerator according to an exemplary embodiment of the present invention.
Figure 8:
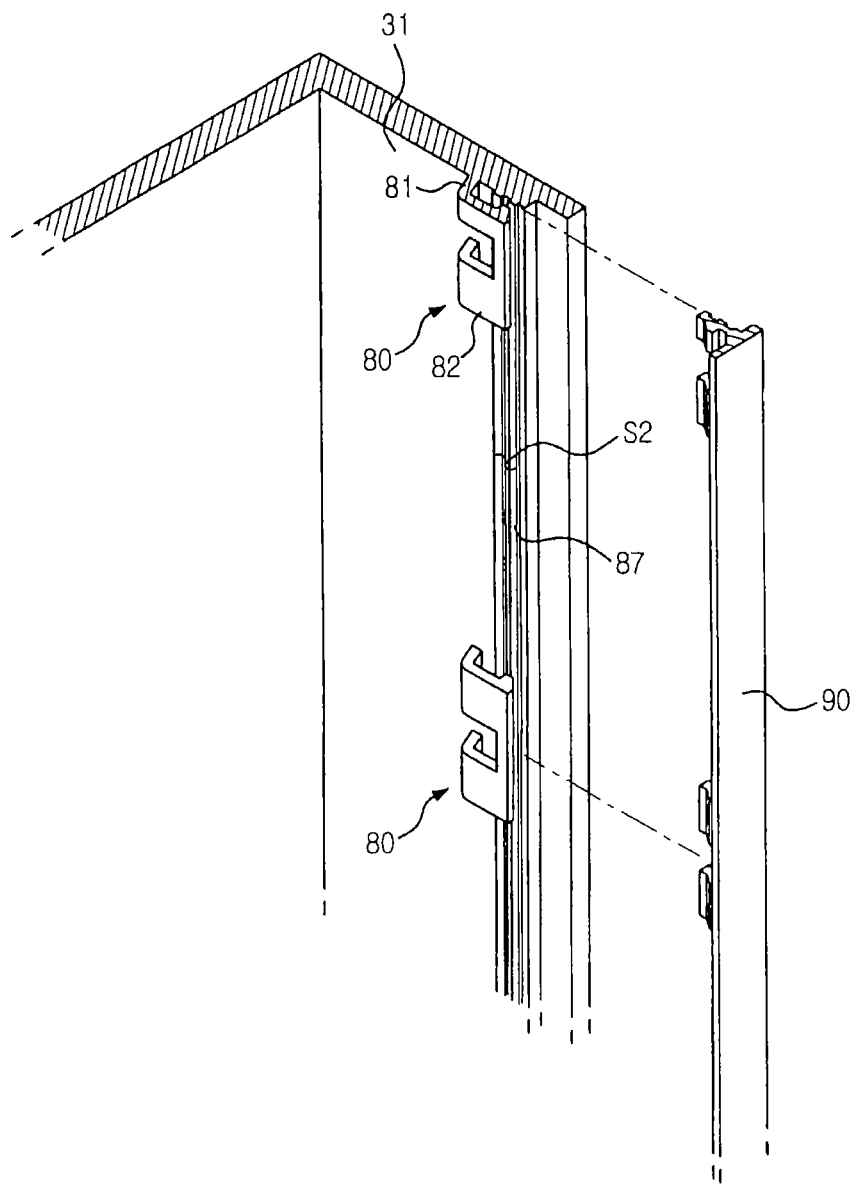
FIG. 8 is an enlarged view of a section C of FIG. 7.

FIG. 7 shows a rear connection state of the refrigerator door according to an exemplary embodiment of the present invention. FIG. 8 is an enlarged view of a section C of FIG. 7 and FIG. 9 is a sectional view cut along a line III-III of FIG. 7.

Figure 9:
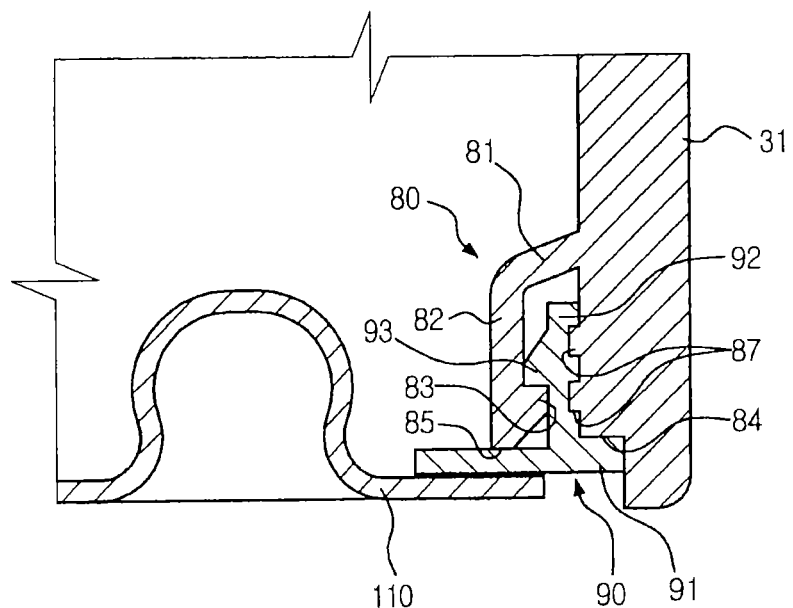
FIG. 9 is a sectional view cut along a line III-III of FIG. 7.

As shown in FIG. 2, FIG. 7 and FIG. 9, the rear side of the door frame 30 is totally opened because the door frame 30 is manufactured by one-time injection molding. Therefore, any mounting part, such as the decoration member mounting part 40 formed at the front side 35, cannot be dedicatedly formed at the rear side of the door frame 30. To this end, the door frame 30 is equipped with a rear panel mounting assembly 100 that supports a rear panel 110 from the rear side.

The rear panel mounting assembly 100 includes a supporting member 90 mounting the rear panel 110 therein, and a fastening member 80 fixing the supporting member 90 to the door frame 30. Whereas the supporting member 90 is formed as a separate part from the door frame 30, the fastening member 80 is formed as an integrated body with the door frame 30 by injection molding.

The fastening member 80 is formed in a plural number, being disposed on insides of the both lateral sides 31 and 32, the top side 33 and the bottom side 34 at predetermined intervals. The fastening member 80 includes a projection part 81 protruded from the both lateral 31 and 32, the top side 33 and the bottom side 34. The fastening member 81 also includes an extension part 82 extended toward the rear side from the projection part 81. A stepped part formed at an end of the lateral sides 31 and 32, the top side 33 and the bottom side 34 corresponds to an outer supporting platform 84. An end of the extension part 82 corresponds to an inner supporting platform 85. The extension part 82 further includes an upper fixing platform 83 for engagement with the supporting member 90.

The supporting member 90 is elongated along the lengths of the lateral sides 31 and 32, the top side 33 and the bottom side 34, having a substantially T-shape sectional shape. More specifically, the supporting member 90 includes an upper supporter 91 corresponding to a horizontal part of the T-shape section and a lower supporter 92 vertically formed on the upper supporter 91. The upper supporter 91 is supported by the outer supporting platform 84 and the inner supporting platform 85. The lower supporter 92 includes a lower fixing platform 93 for engagement with the upper fixing platform 83 of the fastening member 80. The supporting member 90 is inserted in the fastening member 80 and during this, the supporting member 90 is elastically deformed since being made of resin.

A second space S2 is formed between the plurality of fastening members 80. Since the foam material may leak through the second space S2, holding members 87 are formed in multiple folds along the inner lengths of the lateral sides 31 and 32, the top side 33 and the bottom side 34. The holding members 87 prevent expansion of the foam material, thereby preventing the foam material from leaking through gaps between the respective sides 31 to 34 and the rear panel 110.

Figure 10:
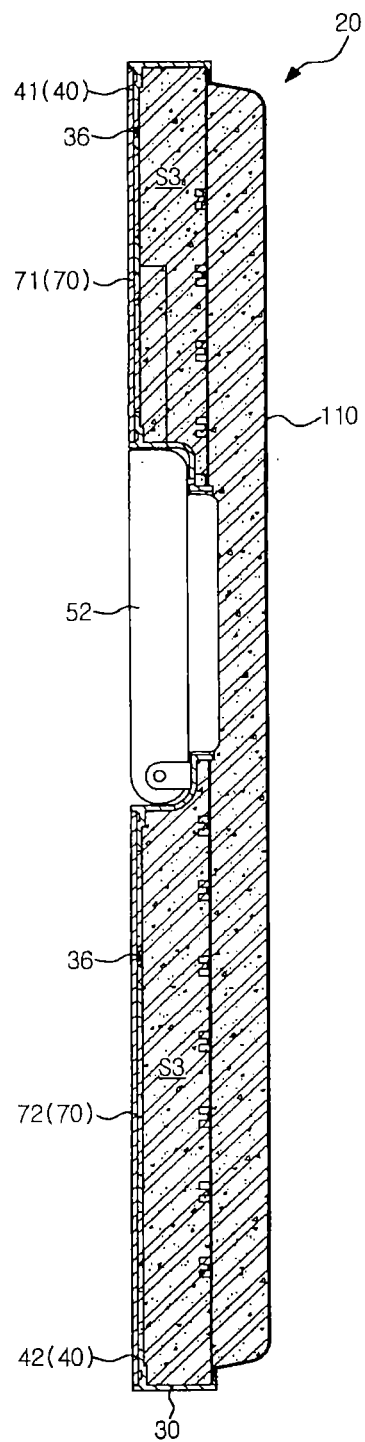
FIG. 10 is a sectional view of the door of the refrigerator according to an exemplary embodiment of the present invention.

FIG. 10 is a sectional view of the refrigerator according to an exemplary embodiment of the present invention.

Referring to FIG. 2, FIG. 7 and FIG. 9, when manufacturing the door 20 of the refrigerator, the door frame 30 is formed as an integrated body through injection molding. That is, the door frame 30 is formed to include all of the lateral sides 31 and 32, the top side 33 and the bottom side 34, the decoration member mounting part 40, the home bar mounting part 50 and the display mounting part 60.

Next, the decoration member 70 is mounted to the front side 35 of the door frame 30. The rear panel mounting assembly 100 is connected to the rear side of the door frame 30, and the rear panel 110 is mounted to the rear panel mounting assembly 100. Here, the foam material in the form of liquid is injected in a third space S3 formed by the decoration member 70 and the rear panel 110.

The foam material expands through a chemical reaction and contacts the decoration member 70 passing through the openings 36 formed on the decoration member mounting part 40. After a predetermined time elapses, the foam material cures, thereby completely fixing the decoration member 70 to the front side 35 of the door frame 30. The rear panel 110 is fixed by the foam material in the same manner.

As described above, any fixing device is dedicatedly required in attaching the decoration member 70. As a result, the material cost and the number of processes can be saved, thereby improving the productivity.

Furthermore, since the door frame 30 is formed as an integrated body, the appearance of the refrigerator door 20 can be improved, while preventing leakage of the foam material by reducing gaps.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A method for manufacturing a refrigerator door, the method comprising:
    forming a door frame to have a front side, a rear side, a left lateral side, a right lateral side, a top side, and a bottom side, the front side forming a mounting part along a periphery of the door frame, the mounting part forming a position fixing projection having gaps allowing for contraction and expansion of the position fixing projection, and the door frame defining an inner space comprising at least one opening on the front side of the door frame:
    attaching an adhesive member to the mounting part;
    mounting a front panel to the mounting part via the adhesive member;
    fixing a rear panel to the rear side of the door frame; and
    injecting a foam material into the inner space, the foam material expanding through each of the at least one opening to come into contact with a rear surface of the mounted front panel so as to fix the front panel to the door frame by adhesion of the foam material, the front panel thereby being attached to the door frame without engaging any portion of the door frame with a front surface of the front panel.

2. The manufacturing method according to claim 1, wherein the position fixing projection has a smaller height than the front panel.

3. The manufacturing method according to claim 1, wherein the position fixing projection has a height substantially identical to a height of the front panel.

4. The method of claim 1, wherein the door frame front, rear, left lateral, right lateral, top, and bottom sides are formed as an integrated body with the mounting part and position fixing projection through injection molding.

5. The method of claim 1, wherein the injected foam also expands into contact with the fixed rear panel and upon curing also permanently fixes the rear panel to the door frame by adhesion.

6. The method of claim 1, wherein the door frame rear side forms a fastening member as part of a rear panel mounting assembly.

7. The method of claim 1, wherein the attached front panel lies flush with a front surface of the position fixing projection.

8. The method of claim 1, wherein the gaps are arranged at predetermined intervals.

9. The method of claim 1, wherein the contraction and expansion of the position fixing projection result from variation in temperature.

10. The method of claim 1, wherein the position fixing projection is elastic.

11. The method of claim 1, wherein the front panel mounting part has a groove formed along a lower periphery of the position fixing projection, the groove increasing elasticity of the position fixing projection.

12. The method of claim 1, wherein the door frame front side comprises a display mounting part projecting a shorter distance than the front panel mounting part.

13. The method of claim 12, wherein a handle part is formed in the distance gap lying between the display mounting part and front panel mounting part.

* * * * *